United States Patent [19]

Holl et al.

[11] Patent Number: 4,894,167

[45] Date of Patent: Jan. 16, 1990

[54] PROCESS FOR REMOVING HEAVY METAL CATIONS AND/OR ALKALI METAL CATIONS FROM AQUEOUS SOLUTIONS WITH AN ION EXCHANGER MATERIAL

[75] Inventors: Wolfgang Holl, Ettlingen; Siegfried Eberle, Eggenstein; Jurgen Horst, Karlsruhe, all of Fed. Rep. of Germany

[73] Assignee: Kernforschungszentrum Karlsruhe GmbH, Fed. Rep. of Germany

[21] Appl. No.: 179,779

[22] Filed: Apr. 11, 1988

[30] Foreign Application Priority Data

Apr. 11, 1987 [DE] Fed. Rep. of Germany ..... 87105409

[51] Int. Cl.[4] ........................... B01J 49/00; C02F 1/42
[52] U.S. Cl. .................................... 210/673; 210/681; 210/688; 521/26
[58] Field of Search ............... 210/670, 673, 681, 685, 210/686, 688; 521/26

[56] References Cited

U.S. PATENT DOCUMENTS

| | | | |
|---|---|---|---|
| 3,589,999 | 6/1971 | McRae et al. | 210/685 |
| 3,961,981 | 6/1976 | Pollio | 127/46 A |
| 4,299,922 | 11/1981 | Holl et al. | 521/26 |
| 4,448,693 | 5/1984 | Kiehling et al. | 210/673 |

FOREIGN PATENT DOCUMENTS 2714297 5/1978 Fed. Rep. of Germany .
1166151 8/1969 United Kingdom .
1576100 1/1980 United Kingdom .

OTHER PUBLICATIONS

F. Schneider, "Technologie des Zuckers", Verlag Schaper, Hannover, (1968), Chapter 10, pp. 609 to 629.
Lewatit, "Entfernung Geloster Schwermetall-Spuren aus Neutralisiertem Mischabwasser durch Lewatit--Ionenaustauscher", Technische Information, (1-Aug. 1981), Bayer AG.

Primary Examiner—Ivars Cintins
Attorney, Agent, or Firm—Sughrue, Mion, Zinn, Macpeak & Seas

[57] ABSTRACT

A process for removing heavy metal cations and/or alkali metal cations from aqueous solutions with an ion exchanger material that comprises a cation exchanger loaded with alkaline earth metal ions, and subsequently regenerating the loaded or exhausted ion exchanger material. The loaded or spent cation exchanger either alone or in a mixture with an anion exchanger is regenerated by bringing it into contact with an aqueous suspension of a slightly soluble carbonate and/or hydroxide of an alkaline earth metal ion and/or a completely or partially calcined, natural carbonate and introducing a $CO_2$-containing gas into the suspension.

5 Claims, 4 Drawing Sheets

PROCESS FOR REMOVING HEAVY METAL CATIONS AND/OR ALKALI METAL CATIONS FROM AQUEOUS SOLUTIONS WITH AN ION EXCHANGER MATERIAL

BACKGROUND OF THE INVENTION

The present invention relates to a process for removing heavy metal cations and/or alkali metal cations from aqueous solutions with an ion exchanger material, which comprises a cation exchanger loaded with alkaline earth metal ions, and subsequently regenerating the loaded or exhausted ion exchanger material.

In many areas of chemical technology ion exchangers have been used successfully for the treatment of all types of saline aqueous solutions. The ion exchangers cannot destroy any pollutants. However, they can, for example, enrich pollutants of which there are only small concentrations in the solution, such as e.g., heavy metals. Furthermore, ion exchangers permit the replacement of ions that are not hygenically harmful but which prevent the process from operating efficiently or which make the process more difficult to operate by other ions, which do not have these properties.

As a rule, the chemical reactions on the ion exchangers are reversible. This means that the direction of the exchange can be reversed by the addition of suitable chemicals. As a result of this characteristic for regeneration, ion exchanger resins can be reused almost indefinitely. During regeneration, the pollutants that are only slightly concentrated in the original solution are freed from the exchanger and thereby become available in an eluate solution in concentrated form in which they can be more readily removed or further processed.

The state of the art for removing heavy metals from dilute aqueous solutions (e.g. raw water) is the use of cation exchangers that are conditioned, i.e., completely or partially loaded with sodium or calcium (LEWATIT ® "Entfernung gelöster Schwermetall-Spuren aus neutralisiertem Mischabwasser durch Lewatit-Ionenaustauscher, Technische Information [in translation, LEWATIT ® "Removal of Dissolved Heavy Metal Traces from Neutralized Mixed Wastewater by means of LEWATIT Ion Exchangers" Technical Information], (1 Aug. 1981) Bayer AG), as illustrated in equation (1).

$$R=Na_2+Cu^{2+}\rightarrow R=Cu+2Na^+ \tag{1}$$

Usually, the spent exchanger resin produced according to equation (1) is regenerated in two sequential, separate steps. In the first step, as shown in equation (2), the spent exchanger is converted into the free acid form with a strong mineral acid:

$$R=Cu+2HCl\rightarrow R=H_2+CuCl_2 \tag{2}$$

Then, in the second step, as shown in equation (3), the exchanger resin is conditioned with an NaOH solution or a Ca(OH)$_2$ solution, that is, it is converted into the desired type of neutral salt:

$$R=H_2+2NaOH\rightarrow R=Na_2+H_2O \tag{3}$$

The result of the first regeneration step is that additional ions get into the wastewater, so that a quantity of salt that is larger than the quantity removed from the raw water in the work cycle has to be removed.

The state of the art for removing alkali metal ions is, for example, the reduction of the concentration of the alkali ions, such as sodium and potassium ions in aqueous sugar solutions, by means of cation exchangers, which are loaded with calcium or magnesium, as illustrated in equation (4). (F. Schneider: "Technologie des Zuckers", Verlag Schaper [in translation "Technology of Sugar", Schaper Publishing Company], Hannover, (1968), Chapter 10 "Ionenaustausch" [in translation "Ion Exchange"], in particular pages 609 to 629).

$$R=Mg+2Na^+\rightarrow R=Na_2+Mg^{2+} \tag{4}$$

In processes according to the state of the art, magnesium chloride is used for regenerating the spent exchanger, whereby the anions of the regenerating agent (here the chloride ions) do not take part in the regeneration reaction, as shown in equation (5), and can result in circumstances permitting a noticeable load of additional ions in the wastewater.

$$R=Na_2+MgCl_2\rightarrow R=Mg+2NaCl \tag{5}$$

SUMMARY OF THE INVENTION

An object of the present invention is to provide a process for removing the disturbing cations with cation exchangers from the aqueous solutions, without simultaneously increasing the salt content of the wastewater produced during the regeneration.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for removing heavy metal cations and/or alkali metal cations from an aqueous solution with an ion exchanger material that contains a cation exchanger loaded with alkaline earth metal ions, and subsequently regenerating the loaded or exhausted ion exchanger material, comprising: regenerating the loaded or exhausted cation exchanger, either alone or in a mixture with an anion exchanger, by bringing the exhausted exchanger into contact with an aqueous suspenion containing at least one (a) slightly soluble carbonate of an alkaline earth metal ion, (b) slightly soluble hydroxide of an alkaline earth metal ion, or (c) a completely or partially calcined natural carbonate like e.g. CaCo$_3$.-MgO, and introducing a CO$_2$-containing gas into the suspension.

A strong-acid cation exchanger or a weak-acid cation exchanger e.g. commercially available exchange resins, or a mixed bed of anion and cation exchanger material e.g. as described in U.S. Pat. No. 4,448,693, can be used as ion exchanger material.

In a preferred embodiment of the process of the present invention, during the introduction of CO$_2$-containing gas, the partial pressure of the CO$_2$ in the suspension ranges between 0.1 and 10 bar for regeneration of the loaded or spent exchanger. The CO$_2$-containing gas can be passed into the aqueous suspension of slightly soluble carbonates and/or hydroxides of alkaline Dissolved CO$_2$ reacts with alkaline earth carbonates to give easily soluble bicarbonates; thus the amount of alkaline earth ions is increased. At a given amount of ion exchanger the amount of exchangeable ions is defined; thus the aqueous suspension must be provided in an amount and in a concentration which are sufficient to remove the desired quantity of the resin bound second alkaline earth ion species. earth metal ions, or completely or partially calcined natural carbonates, before the suspension is brought into contact with the loaded or spent ion exchanger material. However, the $CO_2$-containing gas can also be introduced into the suspension of loaded or spent ion exchanger material and carbonates and/or hydroxides of alkaline earth metal ions.

It is especially advantageous that the regeneration of the loaded or spent cation exchanger include not only the elution of the heavy metal and/or alkali metal cations, but also the conditioning of the exchanger into the loaded form with alkaline earth metal ions and that it be carried out in one single processing step.

It is to be understood that both the foregoing general description and the following detailed description are exemplary and explanatory, but are not restrictive of the invention.

DETAILED DESCRIPTION OF THE INVENTION

During regeneration, the metal ions that were previously accepted into the exchanger during the removal of the undesired cations from the water being treated are displaced again and replaced by the desired alkaline earth ions. If the exhausted exchanger resin, for example, is to be converted during the regeneration from the copper form into the calcium form, a $Ca(HCO_3)_2$ solution is produced from a $CaCO_3$ suspension by the introduction of $CO_2$, as shown in equation (6):

$$CaCO_3 + CO_2 + H_2O \rightleftharpoons Ca(HCO_3)_2 \qquad (6)$$

When this suspension is brought into contact with the exhausted exchanger resin, the exchanger accepts calcium and releases copper ions, as shown in equation (7):

$$R=Cu + Ca(HCO_3)_2 \rightarrow R=Ca + Cu(HCO_3)_2 \qquad (7)$$

The concentration of calcium ions that are required for regeneration can be increased by adding an anion exchanger resin to the system according to U.S. Pat. No. 4,448,693. Contact with a carbonic acid solution increases the hydrogen ion concentration so that the dissolution of $CaCO_3$ is improved. Cation ion exchangers and mixtures of cation and anion ion exchangers can be used in the same manner.

The conversion of the heavy metal ion, which is released by the exchanger, into a slightly soluble form (e.g., malachite) is advantageous for carrying out the regeneration in the process of the invention. In this process the copper concentration in the aqueous solution remains small so that despite the strong affinity of resin for copper, a regenerating effect that is adequate for commercial application is achieved.

If, for example, the exchanger resin that is used to purify sugar solutions is to be converted from the alkali metal form into the magnesium form, a $Mg(OH)_2$ solution is analogously saturated with $CO_2$ to produce a $Mg(HCO_3)_2$ solution as shown in equation (8), and this is brought into contact with the exhausted exchanger resin, with the overall reaction being shown in equation (9):

$$Mg(OH)_2 + 2CO_2 \rightleftharpoons Mg(HCO_3)_2 \qquad (8)$$

$$R=Na_2 + Mg(OH)_2 + 2CO_2 \rightarrow R=Mg + 2NaHCO_3 \qquad (9)$$

In this case, the exhausted cation exchanger accepts magnesium ions and releases its alkali metal ions. In this process one advantage is that weak-acid exchanger resins have a distinctly strong affinity for divalent counterions. Despite the small magnesium concentration in the solution, the exchanger can almost completely displace the alkali metal ions.

The process of the invention is explained in the following by means of a description of some examples and relates figures; the process, however, is not restricted to these cases.

EXAMPLE 1

This example illustrates the efficiency of regeneration of a cation exchanger, which had been used to remove alkali metal ions from aqueous solutions.

Figure 1:
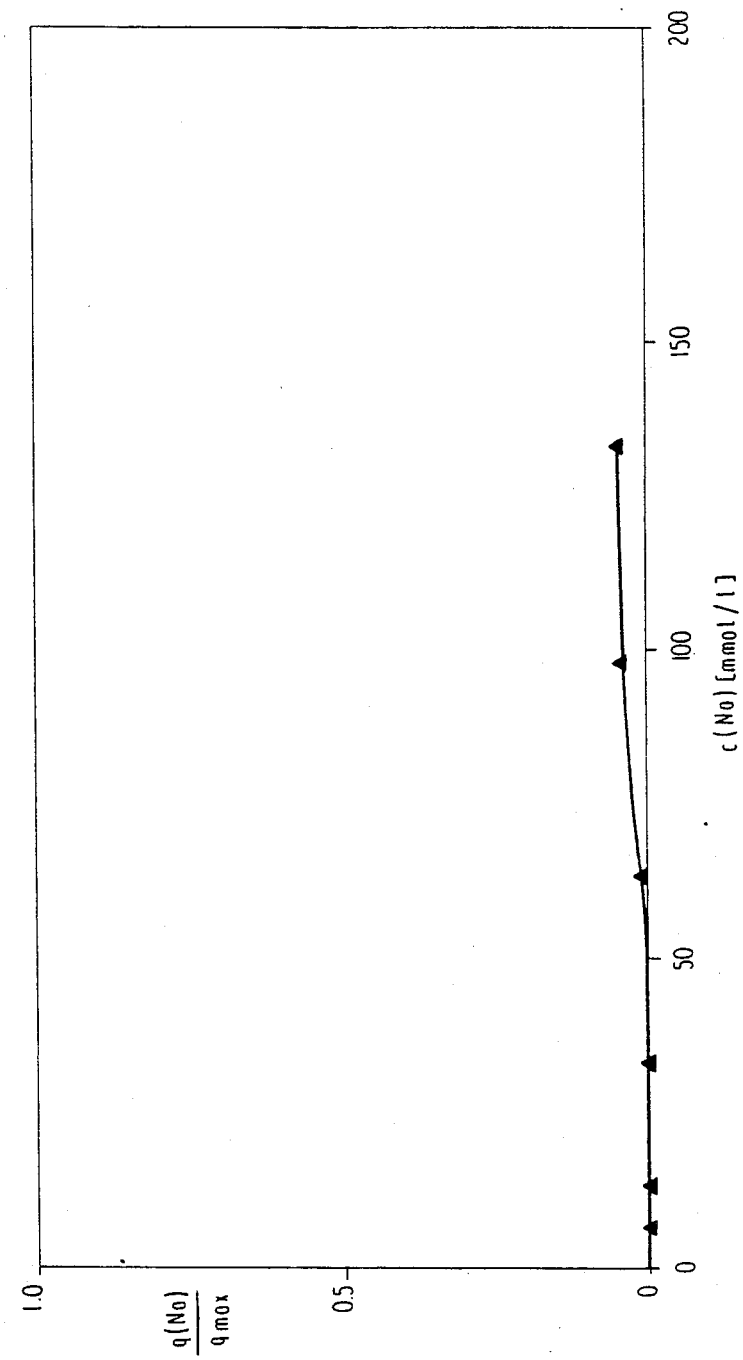
FIGS. 1 to 4 are graphs showing results achieved by performing the process of the present invention according to Examples 1 to 3.

FIG. 1 shows the equilibrium of the regeneration, formulated by the equations (8) and (9), using as an example a commercially-available weak-acid cation exchanger (Amberlite IRC50) with a 3% $Mg(OH)_2$ suspension or $Mg(HCO_3)_2$ solution, which exchanger was originally completely loaded with sodium ions (for example, from a sugar solution). The figure shows the residual load of the exchanger with sodium (in proportion to the total capacity $q(Na)/q_{max}$), versus the sodium concentration in the solution ($c(Na)$ in mmol/l)). For measuring the equilibrium resin, samples of 0.2 g to 20 g were contacted with 0.2 l of suspension. During the regeneration process, the $CO_2$ pressure was maintained at 1 bar and the temperature of the solution was 20° C.

As can be seen from FIG. 1, the alkali metal ions are completely displaced during the regeneration up to relatively high sodium concentrations in the solution.

Figure 2:
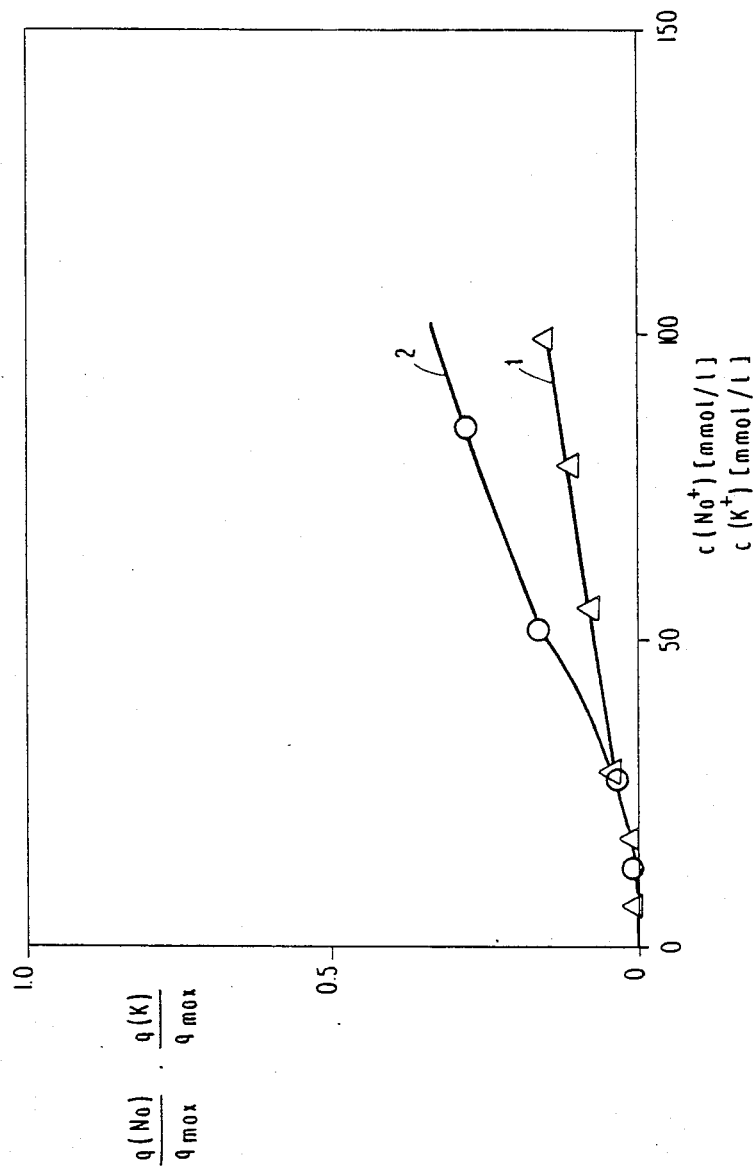

FIG. 2 shows analogous equilibrium curves for a commercially available, strong-acid exchanger resin (IMAC C16P), which was originally loaded with sodium or potassium ions and which was regenerated at 20° C. (curve 1, resin in Na+ form) or 60° C. (curve 2, resin in K+ form).

In the case of FIG. 2, too, the exchanger is almost completely regenerated. In each test, whose results are complied in FIGS. 1 and 2, the partial pressure of $CO_2$ was 1 bar.

EXAMPLE 2

This example illustrates the reusability of a regenerated ion exchanger material.

Copper was removed from a copper sulfate solution with a mixture of a weak-acid cation exchanger resin (Amberlite IRC50) and a strong-base anion exchanger resin (Amberlite IRA410). The resin mixture comprised 600 ml of cation exchanger and 300 ml of anion exchanger.

Prior to the start of regeneration, the cation exchanger was completed loaded with copper; the anion exchanger, completely with sulfate. The loaded exchanger mixture was regenerated in three sequential steps each with fresh solution, each at 20° C., with 900 ml of a 0.5% $CaCO_3$ suspension, which was saturated with CO$_2$ at 4 bar CO$_2$ partial pressure. The ion exchanger material regenerated thus was reused for the removal of copper.

Figure 3:
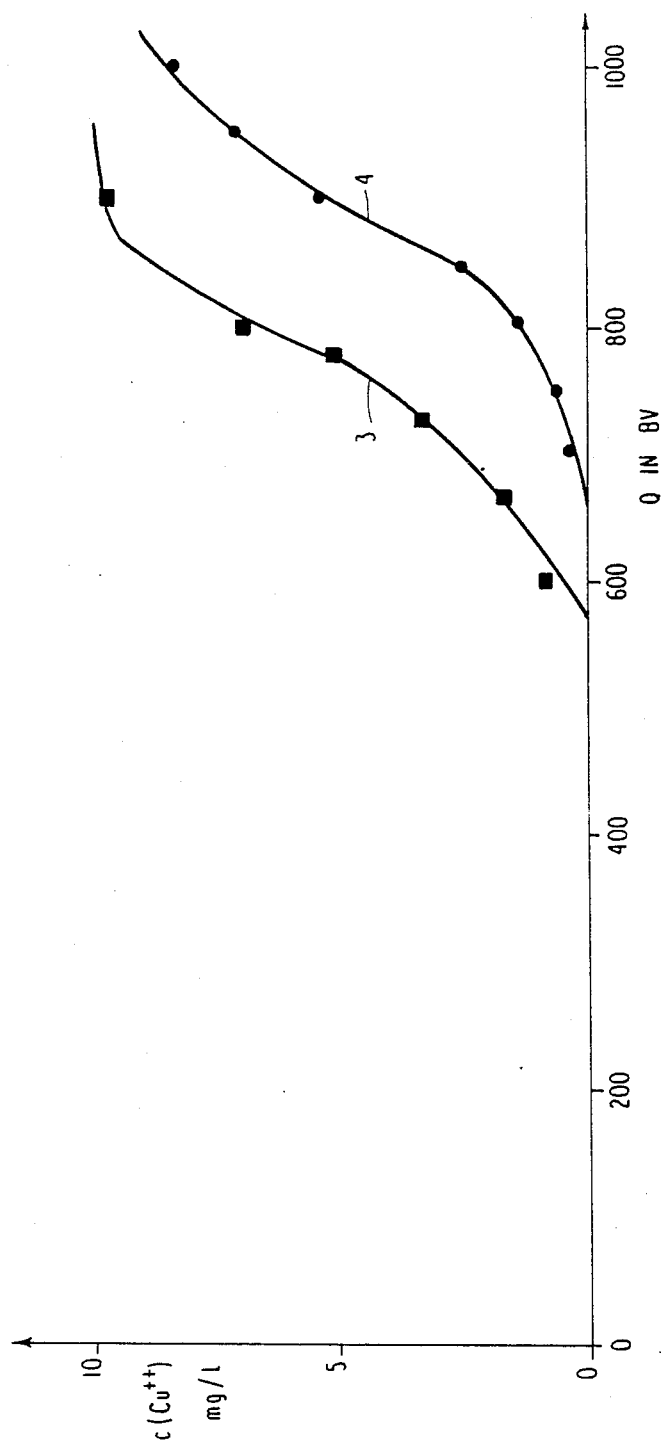

FIG. 3 shows the results of the subsequent use of the regenerated exchanger to remove copper from an aqueous solution as a plot of the effluent copper concentrations versus the throughput. Curves 3 and 4 (the differences are the result of the different results of regeneration) show that the exchanger mixture can completely remove the copper from a CuSO$_4$ solution with 10 mg/l copper over a throughput of approximately 700 bed volumes (BV) (=700×900 ml of Cu containing solution). Further improvements are anticipated by optimizing the process of the invention.

EXAMPLE 3

The removal of alkali metal ions from a concentrated solution containing 100 mmol/l NaCl and KCl respectively was investigated with a strong-acid cation exchanger resin (with the trade name Amberlite 252 ZU). Solutions with such concentrations occur in the treatment of sugar. After the exchanger resin had been loaded, the exchanger was treated with 11 bed volumes of a 3% Mg(OH)$_2$ suspension for regeneration. This suspension was saturated with CO$_2$ at 7 bar. The temperature was 20° C.

In the spent regeneration solution, the sodium concentration was 75 mmol/l and the potassium concentration was 105 mmol/l.

Figure 4:
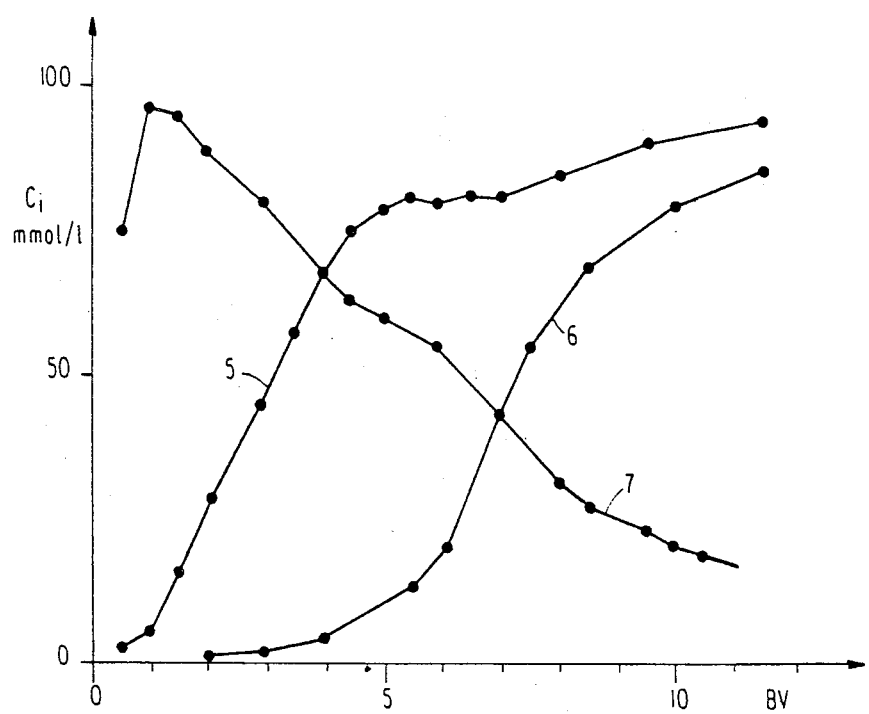

FIG. 4 shows the results of the subsequent use of the regenerated exchanger to remove Na+ or K+ from aqueous solution. The throughput during this subsequent use was 1 bed volume (BV) per hour. The breakthrough curves for sodium (curve 5) and for potassium (curve 6), which show the development of the concentration of these ions in the product water, demonstrate that both ions are almost completely eliminated in the beginning.

Since potassium ions are preferred over sodium ions by usual cation exchange resins, the breakthrough of sodium occurs before that of potassium. Curve 7 shows the development of the Mg++ concentration in the product solution.

It will be understood that the above description of the present invention is susceptible to various modifications, changes and adaptations, and the same are intended to be comprehended within the meaning and range of equivalents of the appended claims.

What is claimed is:

1. Process for removing heavy metal cations and/or alkali metal cations from an aqueous solution with an ion exchanger material that contains a cation exchanger loaded with alkaline earth metal ions, and subsequently regenerating the loaded or exhausted ion exchanger material comprising:

contacting an aqueous solution which contains heavy metal ions and/or alkali metal ions with an ion exchange material comprising a cation exchanger loaded with alkaline earth metal ions, and subsequently regenerating the loaded or exhausted cation exchanger, either alone or in a mixture with an anion exchanger, by introducing a CO$_2$-containing gas into an aqueous suspension containing at least one (a) slightly soluble carbonate of an alkaline earth metal ion, (b) slightly soluble hydroxide of an alkaline earth metal ion, or (c) a completely or partially calcined natural carbonate wherein the partial pressure of the CO$_2$ in the suspension is from 0.1 to 10 bar, and bringing the CO$_2$-containing suspension into contact with the loaded or exhausted cation exchanger.

2. Process as claimed in claim 1, wherein the ion exchanger material is a strong-acid cation exchanger.

3. Process as claimed in claim 1, wherein the ion exchanger material is a weak-acid cation exchanger.

4. Process as claimed in claim 1, wherein the ion exchanger for removing cations is a mixed bed of anion and cation exchanger material.

5. Process as claimed in claim 1, wherein the aqueous suspension is a suspension of a slightly soluble carbonate and/or hydroxide of the alkaline earth metal ion and the CO$_2$-containing gas is introduced into the suspension of slightly soluble carbonate and/or hydroxide of the alkaline earth metal ion.

* * * * *